(No Model.)
W. F. SIMMONS.
MECHANISM FOR BENDING PIPE.
No. 567,518. Patented Sept. 8, 1896.
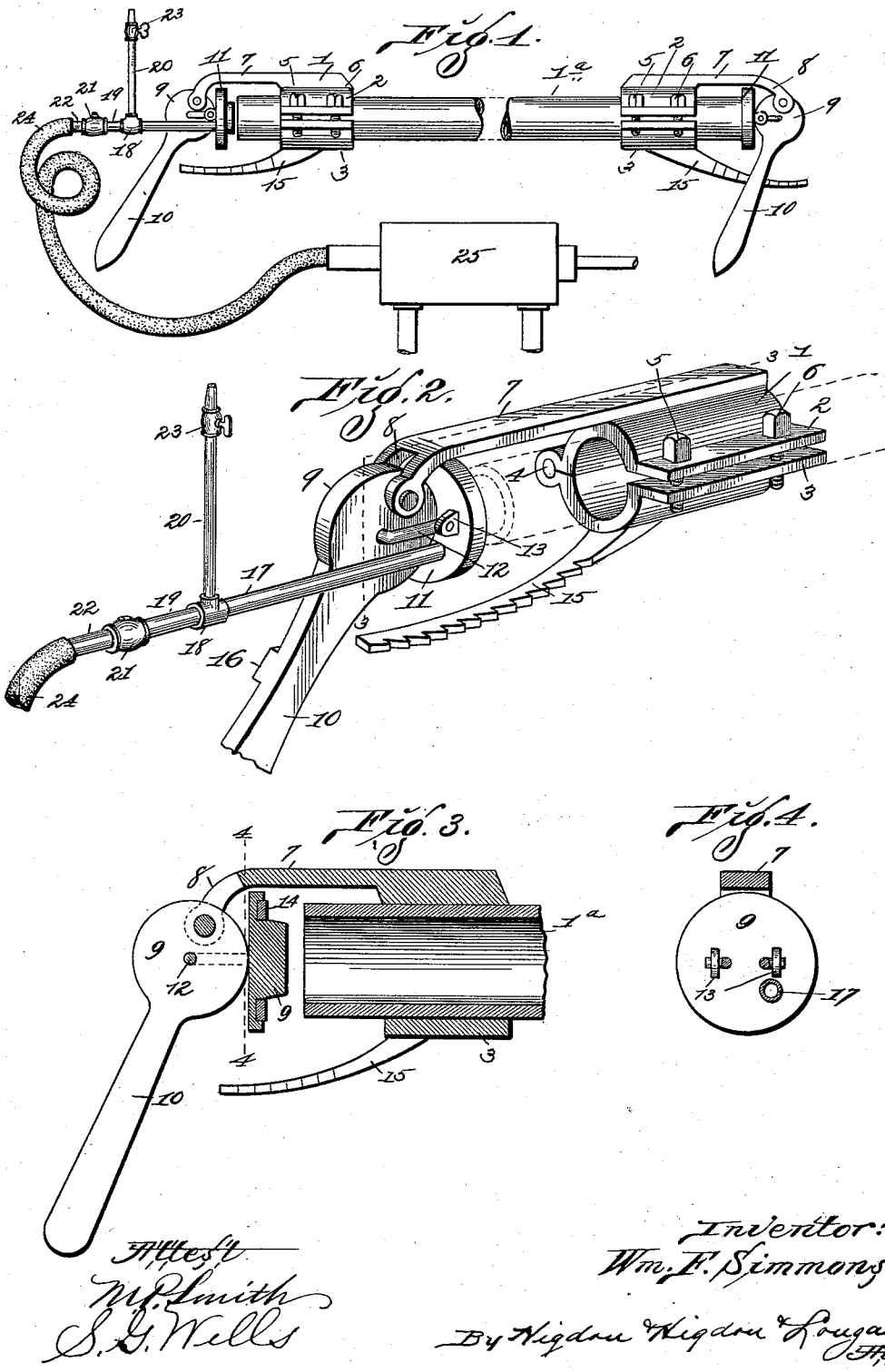
Inventor:—
Wm. F. Simmons.
By Higdon & Higdon & Longan
Attys
Attest
M. P. Smith
S. G. Wells

UNITED STATES PATENT OFFICE.

WILLIAM F. SIMMONS, OF ST. LOUIS, MISSOURI, ASSIGNOR OF TWO-THIRDS TO WILLIAM DREES AND JOHN W. HOLMES, OF SAME PLACE.

MECHANISM FOR BENDING PIPE.

SPECIFICATION forming part of Letters Patent No. 567,518, dated September 8, 1896.

Application filed February 26, 1896. Serial No. 580,847. (No model.)

*To all whom it may concern:*

Be it known that I, WILLIAM F. SIMMONS, of the city of St. Louis, State of Missouri, have invented certain new and useful Improvements in Mechanism for Filling Metal Pipes with Liquid and Sealing the Same, of which the following is a full, clear, and exact description, reference being had to the accompanying drawings, forming a part hereof.

My invention relates to mechanism for filling soft-metal pipes with liquid and sealing the ends of said pipes preparatory to bending the same, and is hereinafter more fully described, reference being had to the accompanying drawings and description for the purpose of fully explaining the mechanism which I employ.

The object of my invention is to bend soft-metal pipe into any desired shape without danger of a sinking in or flattening. The mechanism is designed for plugging the ends of the pipe air-tight and forcing liquid into the pipe under sufficient pressure to expel all the air and compress the liquid to some extent. After the pipe has been filled with liquid under sufficient pressure and hermetically sealed by the turning of valves or otherwise it may be taken to an anvil or vise or other convenient place and bent into the desired form. The compressed liquid within the pipe will effectually prevent the pipe from sinking in or flattening during the operation of bending. In the accompanying drawings I show the best and most convenient way of carrying out the object of my invention.

In the drawings, Figure 1 is a perspective showing the mechanism for forcing liquid into the pipe and sealing or closing the pipe after it is so filled, the pipe being broken in two in the middle. Fig. 2 is a perspective of a clamp and means of closing the pipe. Fig. 3 is a sectional view on the line 3 3 of Fig. 2. Fig. 4 is a cross-section on the line 4 4 of Fig. 3.

Referring by numerals to the accompanying drawings, 1 is a clamp designed to be used upon or near the end of a pipe and consists of the portions 2 and 3, hinged together by the pin 4. This clamp is in the shape of a split bearing and has lips on the side opposite the hinge, which are held together by lag-screws 5 and 6, as shown in Figs. 1 and 2. An arm 7 is attached to the part 2 of the clamp and has a bifurcated end 8, to which is eccentrically pivoted a disk 9, to which is attached a handle or lever 10. To the disk 9 is attached a plug 11, designed to fit tightly in the end of the pipe to be bent, by means of a link 12, pivoted in the center of the disk 9 and to the ears 13 on said plug 11. Suitable rubber packing 14 is placed around the plug 11 to assist in making the joint tight when said plug is inserted in the end of the pipe, as shown in Fig. 3. On the under side of the clamp and attached to the part 3 is a ratchet-face arm 15, and on the side of the handle 10 is a lug 16, designed to contact with the teeth on said ratchet-arm 15. A pipe 17 is inserted in the plug 11. A T-coupling 18 is attached to the pipe 17, and in one of the openings of said coupling the pipe 19 is inserted and in the other the pipe 20 is inserted. A check-valve 21 is attached to the pipe 19 and a section of pipe 22 inserted in the opposite end of said check-valve. On the end of the pipe 20 is the cut-off valve 23. A hose 24 connects the section of pipe 22 with a force-pump 25. Of course the pipe and hose just described need only be attached to one of the plugs 11 or to one end of the pipe to be treated.

In the operation of my improved mechanism for bending pipe a clamp 1 is placed upon each end of the pipe 1ᵃ to be treated and is securely fastened thereto by means of the lag-screws 5 and 6 in such a position that the plug 11 will come immediately over the aperture in the end of the pipe. Then the lever 10 is operated, so as to force the plug 11 tightly into the end of the pipe, and the lug 16 is then brought into contact with the arm 15, and thereby the lever 10 is held firmly in the required position to hold the plug in the pipe securely. After both ends of the pipe have been hermetically sealed in this manner the hose 24 is coupled to the pipe 22, and then the pump is operated to force liquid into the pipe through said hose and its connection. The cut-off valve 23 is left open to allow the air to escape from the pipe as the liquid is forced into it. The operation of the pump is continued until the liquid begins to run out of the cut-off valve 23. This indicates that the air has been entirely exhausted from the pipe, and the cut-off valve is then closed. The operation of the pump is continued until the liquid in the pipe is under considerable pressure. The check-valve 21 prevents the escape of the liquid after it is once forced into the pipe, and after sufficient pressure has been secured the hose 24 may be uncoupled from the pipe 22, and the pipe, with the connections, plugs, and attachments, as described, may be carried to any convenient place or machine, where it may be bent into any desired shape. It is thought to be unnecessary and undesirable to show mechanism for bending the pipe, as my invention herein relates exclusively to treating the pipe in such a way that it is prepared for being bent and does not relate particularly to the act of bending.

My improved mechanism for bending pipe, or for treating pipe preparatory to its being bent, is simple and will be found very effective by plumbers and others using soft-metal pipe.

I claim—

1. In a device of the class described, a clamp designed to engage one end of the pipe, an arm attached to said clamp and extending longitudinally from said clamp, a disk eccentrically pivoted to the outer end of said arm, a handle fixed to said disk for operating the same, a plug pivotally connected to said disk, and means of holding said handle in the desired position, substantially as specified.

2. In a device of the class described, a clamp designed to engage one end of the pipe, an arm attached to said clamp and extending longitudinally from said clamp, a disk eccentrically pivoted to the outer end of said arm, a handle fixed to said disk for operating the same, a plug pivotally connected to said disk, a ratchet-faced arm attached to said clamp and a lug on said lever designed to engage said ratchet-face, substantially as specified.

3. In a device of the class described, a plug designed to close the end of the pipe, means of holding said plug in position, a section of pipe attached to and penetrating through said plug, a T-coupling on the outer end of said pipe, pipes in each of the openings in said T-coupling and valves in said pipes, substantially as specified.

In testimony whereof I affix my signature in presence of two witnesses.

WILLIAM F. SIMMONS.

Witnesses:
SEMER G. WELLS,
M. P. SMITH.